(12) United States Patent
Sportelli (10) Patent No.: US 11,318,790 B2
(45) Date of Patent: *May 3, 2022

(54) SHEAR BAND AND NON-PNEUMATIC TIRE

(71) Applicant: The Goodyear Tire & Rubber Company, Akron, OH (US)

(72) Inventor: Francesco Sportelli, Bettembourg (LU)

(73) Assignee: The Goodyear Tire & Robber Company, Akron, OH (US)

( * ) Notice: Subject to any disclaimer, the term of this patent is extended or adjusted under 35 U.S.C. 154(b) by 177 days.

This patent is subject to a terminal disclaimer.

(21) Appl. No.: 15/479,548

(22) Filed: Apr. 5, 2017

(65) Prior Publication Data

US 2017/0297371 A1    Oct. 19, 2017

Related U.S. Application Data

(60) Provisional application No. 62/321,984, filed on Apr. 13, 2016.

(51) Int. Cl.
*B60C 7/10*    (2006.01)
*B32B 5/22*    (2006.01)
(Continued)

(52) U.S. Cl.
CPC ............... *B60C 7/102* (2013.01); *B32B 3/08* (2013.01); *B32B 3/12* (2013.01); *B32B 5/022* (2013.01);
(Continued)

(58) Field of Classification Search
CPC . B60C 7/10–125; B60C 7/14–20; B32B 5/00; B32B 5/02; B32B 5/024;
(Continued)

(56) References Cited

U.S. PATENT DOCUMENTS 3,670,504 A    6/1972  Hayes
3,730,244 A *  5/1973  Ross ..................... B29D 30/02
                                                    152/323
(Continued)

FOREIGN PATENT DOCUMENTS

CN      201648829 U    11/2010
CN      202787813 U     3/2013
(Continued)

OTHER PUBLICATIONS

European Search Report dated Aug. 8, 2017 for Application Serial No. EP17165961.

*Primary Examiner* — Z. Jim Yang
(74) *Attorney, Agent, or Firm* — June E. Rickey (57) ABSTRACT

A shear band and a non-pneumatic tire is described which includes a ground contacting annular tread portion; a shear band, and a connecting web positioned between a hub and the shear band. The shear band is preferably comprised of a three-dimensional spacer fabric having a first and second layer connected by connecting members. The three-dimensional spacer fabric has a defined depth. The three-dimensional spacer structure further includes a plurality of cells formed between the connecting members, and wherein one or more of the cells are filled with a filler material. The filler material may be foam or a thermoplastic elastomer.

12 Claims, 10 Drawing Sheets

(51) Int. Cl.
| | |
|---|---|
| *D03D 11/02* | (2006.01) |
| *B32B 5/12* | (2006.01) |
| *B32B 5/02* | (2006.01) |
| *B60C 9/18* | (2006.01) |
| *B60C 7/18* | (2006.01) |
| *B60C 7/14* | (2006.01) |
| *B32B 25/10* | (2006.01) |
| *B32B 3/12* | (2006.01) |
| *B32B 5/10* | (2006.01) |
| *B32B 5/08* | (2006.01) |
| *B32B 25/12* | (2006.01) |
| *B32B 5/18* | (2006.01) |
| *B32B 5/26* | (2006.01) |
| *B32B 3/08* | (2006.01) |
| *B32B 7/12* | (2006.01) |
| *B32B 5/06* | (2006.01) |

(52) U.S. Cl.
CPC .............. *B32B 5/024* (2013.01); *B32B 5/026* (2013.01); *B32B 5/06* (2013.01); *B32B 5/08* (2013.01); *B32B 5/10* (2013.01); *B32B 5/12* (2013.01); *B32B 5/18* (2013.01); *B32B 5/26* (2013.01); *B32B 7/12* (2013.01); *B32B 25/10* (2013.01); *B32B 25/12* (2013.01); *B60C 7/10* (2013.01); *B60C 7/105* (2013.01); *B60C 7/14* (2013.01); *B60C 7/18* (2013.01); *B60C 9/1807* (2013.01); *D03D 11/02* (2013.01); *B32B 2250/04* (2013.01); *B32B 2250/05* (2013.01); *B32B 2262/0261* (2013.01); *B32B 2262/0269* (2013.01); *B32B 2262/0276* (2013.01); *B32B 2262/10* (2013.01); *B32B 2262/101* (2013.01); *B32B 2262/106* (2013.01); *B32B 2262/14* (2013.01); *B32B 2307/546* (2013.01); *B32B 2307/72* (2013.01); *B32B 2307/732* (2013.01); *B32B 2605/00* (2013.01); *B60C 7/146* (2021.08); *D10B 2403/021* (2013.01); *D10B 2505/022* (2013.01)

(58) Field of Classification Search
CPC ........... B32B 5/026; B32B 5/028; B32B 5/06; B32B 5/08; B32B 5/10; B32B 5/12; B32B 5/22; B32B 5/24; B32B 5/245; B32B 5/26; B32B 5/28; B32B 3/12; Y10T 428/24149–24165; Y10T 428/24661
See application file for complete search history.

(56) References Cited

U.S. PATENT DOCUMENTS

| | | | | |
|---|---|---|---|---|
| 4,336,296 A * | 6/1982 | Fukuta | .................. | D03D 41/004 442/205 |
| 4,356,219 A | 10/1982 | Boon | | |
| 5,031,679 A * | 7/1991 | Shoner | .................. | B29D 30/04 428/313.5 |
| 5,589,245 A | 12/1996 | Roell | | |
| 6,112,791 A * | 9/2000 | Spragg | ...................... | B60C 9/18 152/197 |
| 2003/0121581 A1* | 7/2003 | Thompson | .............. | B60C 17/00 152/197 |
| 2003/0226630 A1* | 12/2003 | Delfino | ..................... | B60C 9/18 152/246 |
| 2004/0159385 A1* | 8/2004 | Rhyne | ....................... | B60C 7/00 152/197 |
| 2009/0202763 A1* | 8/2009 | Rose | ........................ | B32B 5/26 428/36.1 |
| 2010/0018621 A1* | 1/2010 | Thompsom | ............... | B60C 7/18 152/5 |
| 2010/0119792 A1* | 5/2010 | Ma | ....................... | A47C 23/002 428/218 |
| 2010/0260967 A1* | 10/2010 | Delfino | ..................... | B60C 7/18 428/113 |
| 2010/0307653 A1* | 12/2010 | Delfino | ..................... | B60B 5/02 152/302 |
| 2011/0011506 A1* | 1/2011 | Manesh | .................... | B60C 7/22 152/328 |
| 2011/0024008 A1* | 2/2011 | Manesh | .................... | B60C 7/22 152/5 |
| 2011/0030866 A1* | 2/2011 | Fadel | ........................ | B60C 7/18 152/311 |
| 2011/0079335 A1* | 4/2011 | Manesh | .................... | B60C 7/12 152/310 |
| 2011/0104428 A1* | 5/2011 | Delfino | ................ | B29D 24/002 428/114 |
| 2011/0168313 A1* | 7/2011 | Ma | .......................... | B60C 7/14 152/302 |
| 2011/0240190 A1* | 10/2011 | Summers | .............. | B60C 99/006 703/1 |
| 2011/0240194 A1* | 10/2011 | Summers | .................. | B60C 7/10 428/116 |
| 2012/0060991 A1* | 3/2012 | Mun | ........................ | B60C 7/18 152/323 |
| 2012/0193004 A1* | 8/2012 | Anderson | ................. | B60C 7/22 152/310 |
| 2012/0318417 A1* | 12/2012 | Dotson | ................. | B60C 9/1807 152/17 |
| 2013/0240272 A1* | 9/2013 | Gass | ........................ | B60B 9/26 152/1 |
| 2013/0284329 A1* | 10/2013 | Wilson | .................... | B60C 7/105 152/17 |
| 2014/0205795 A1* | 7/2014 | Hu | ........................... | B32B 5/028 28/165 |
| 2014/0326374 A1* | 11/2014 | Cron | ....................... | B60C 7/102 152/5 |
| 2014/0367007 A1* | 12/2014 | Thompson | ................ | B60C 7/18 152/17 |
| 2016/0167306 A1* | 6/2016 | Vidimce | ................. | G06F 30/00 425/166 |
| 2017/0106699 A1* | 4/2017 | Iwamura | .................. | B60C 7/06 |
| 2018/0029419 A1* | 2/2018 | Kim | .......................... | B60C 7/12 |
| 2018/0029422 A1* | 2/2018 | Thompson | ................ | B60C 7/18 |
| 2018/0194169 A1* | 7/2018 | Vilcot | ..................... | B60C 7/125 |
| 2018/0361692 A1* | 12/2018 | Haidet | ..................... | B60C 7/08 |
| 2018/0361790 A1* | 12/2018 | Rigo | ........................ | B60C 7/14 |
| 2018/0361791 A1* | 12/2018 | Rigo | ......................... | B60C 9/02 |

FOREIGN PATENT DOCUMENTS

| | | |
|---|---|---|
| DE | 8903440 U1 | 5/1989 |
| DE | 9013194 U1 | 11/1990 |
| DE | 9206771 U1 | 7/1992 |
| DE | 19944437 A1 | 3/2001 |
| DE | 10101429 A1 | 8/2002 |
| DE | 10237634 A1 | 8/2004 |
| WO | 2009055919 A1 | 5/2009 |

* cited by examiner

SHEAR BAND AND NON-PNEUMATIC TIRE

FIELD OF THE INVENTION

The present invention relates generally to vehicle tires and non-pneumatic tires, and more particularly, to a shear band and non-pneumatic tire.

BACKGROUND OF THE INVENTION

The pneumatic tire has been the solution of choice for vehicular mobility for over a century. The pneumatic tire is a tensile structure. The pneumatic tire has at least four characteristics that make the pneumatic tire so dominant today. Pneumatic tires are efficient at carrying loads, because all of the tire structure is involved in carrying the load. Pneumatic tires are also desirable because they have low contact pressure, resulting in lower wear on roads due to the distribution of the load of the vehicle. Pneumatic tires also have low stiffness, which ensures a comfortable ride in a vehicle. The primary drawback to a pneumatic tire is that it requires compressed gasses. A conventional pneumatic tire is rendered useless after a complete loss of inflation pressure.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

Non pneumatic tires are typically defined by their load carrying efficiency. "Bottom loaders" are essentially rigid structures that carry a majority of the load in the portion of the structure below the hub. "Top loaders" are designed so that all of the structure is involved in carrying the load. Top loaders thus have a higher load carrying efficiency than bottom loaders, allowing a design that has less mass.

The purpose of the shear band is to transfer the load from contact with the ground through tension in the spokes or connecting web to the hub, creating a top loading structure. When the shear band deforms, its preferred form of deformation is shear over bending. The shear mode of deformation occurs because of the inextensible membranes located on the outer portions of the shear band. Prior art non-pneumatic tire typically have a shear band made from rubber materials sandwiched between at least two layers of inextensible belts or membranes. The disadvantage to this type of construction is that the use of rubber significantly increases the cost and weight of the non-pneumatic tire. Another disadvantage to the use of rubber is that is generates heat, particularly in the shear band. Furthermore, the rubber in the shear band needs to be soft in shear, which makes it difficult to find the desired compound.

Thus an improved non-pneumatic tire is desired that has all the features of the pneumatic tires without the drawback of the need for air inflation is desired.

BRIEF DESCRIPTION OF THE DRAWINGS

The present invention will be better understood through reference to the following description and the appended drawings, in which.

DEFINITIONS

The following terms are defined as follows for this description.

"Auxetic material" means a material that has a negative Poisson's ratio.

"Equatorial Plane" means a plane perpendicular to the axis of rotation of the tire passing through the centerline of the tire.

"Free area" is a measure of the openness of the fabric per DIN EN 14971, and is the amount of area in the fabric plane that is not covered by yarn. It is a visual measurement of the tightness of the fabric and is determined by taking an electronic image of the light from a light table passing through a six inch by six inch square sample of the fabric and comparing the intensity of the measured light to the intensity of the white pixels.

"Inextensible" means that a given layer has an extensional stiffness greater than about 25 Ksi.

"Knitted" is meant to include a structure producible by interlocking a series of loops of one or more yarns by means of needles or wires, such as warp knits and weft knits.

"Three-dimensional spacer structure" means a three-dimensional structure composed from two outer layers of fabric, each outer layer of fabric having reinforcement members (such as yarns, filaments or fibers) which extend in a first and second direction, wherein the two outer layers are connected together by reinforcement members (yarns, filaments or fibers) or other knitted layers that extend in a defined third direction. An "open" three-dimensional spacer structure is comprised of individual pile fibers or reinforcements that connect the first and second layer of fabric. A "closed" three-dimensional structure utilizes fabric piles that connect the first and second layers.

"Woven" is meant to include a structure produced by multiple yarns crossing each other at right angles to form the grain, like a basket.

DETAILED DESCRIPTION OF THE INVENTION

Figure 1:
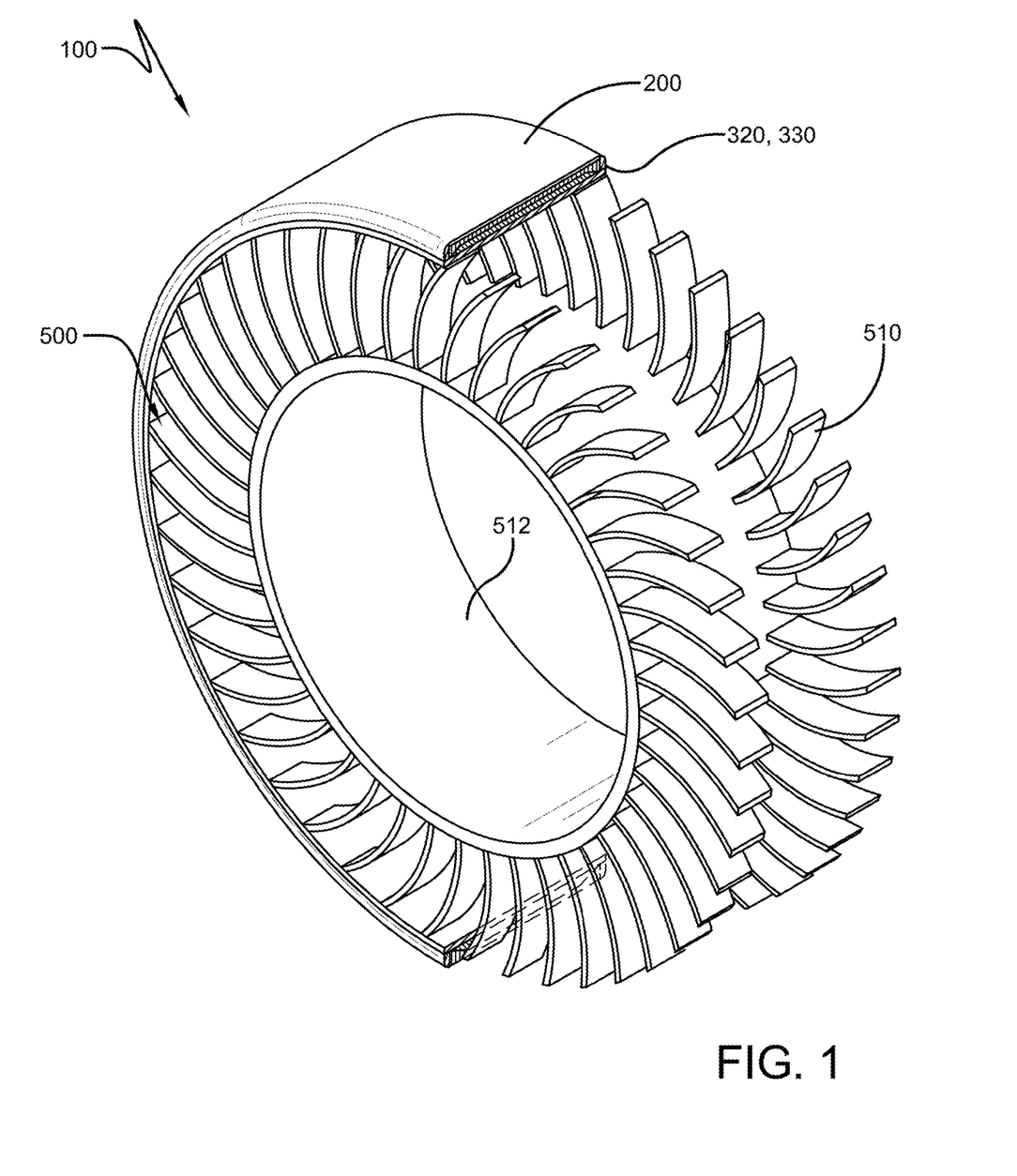
FIG. 1 is a perspective view of a first embodiment of a non-pneumatic tire of the present invention.

A first embodiment of a non-pneumatic tire 100 of the present invention is shown in FIG. 1. The tire of the present invention includes a radially outer ground engaging tread 200, a shear band 300, and a connecting web 500. The tire tread 200 may include elements such as ribs, blocks, lugs, grooves, and sipes as desired to improve the performance of the tire in various conditions. The connecting web 500 is mounted on hub 512 and may have different designs, as described in more detail, below. The non-pneumatic tire of the present invention is designed to be a top loading structure, so that the shear band 300 and the connecting web 500 efficiently carry the load. The shear band 300 and the connecting web are designed so that the stiffness of the shear band is directly related to the spring rate of the tire. The connecting web is designed to be a stiff structure when in tension that buckles or deforms in the tire footprint and does not compress or carry a compressive load. This allows the rest of the connecting web not in the footprint area the ability to carry the load, resulting in a very load efficient structure. It is desired to allow the shearband to bend to overcome road obstacles. The approximate load distribution is preferably such that approximately 90-100% of the load is carried by the shear band and the upper portion of the connecting web, so that the lower portion of the connecting web carry virtually zero of the load, and preferably less than 10%.

Shear Band

The shear band 300 is preferably an annular structure that is located radially inward of the tire tread 200 and functions to transfer the load from the bottom of the tire which is in contact with the ground to the spokes and to the hub, creating a top loading structure. The annular structure 300 is called a shear band because the preferred form of deformation is shear over bending.

Figure 2A:
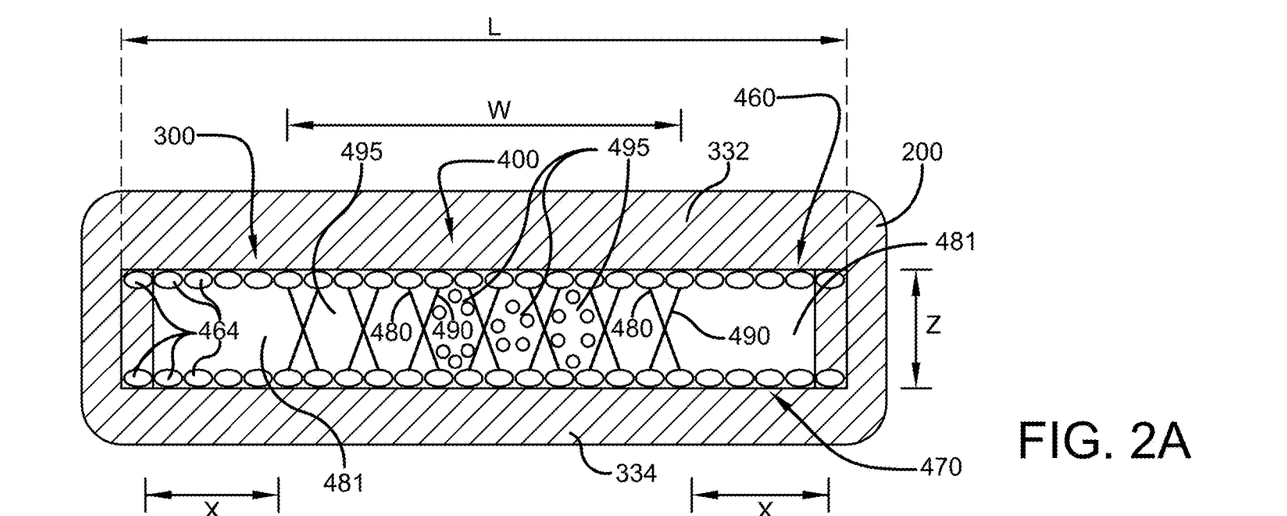
FIG. 2A is a cross-sectional view of a first embodiment of a shear band and outer tread.
Figure 3A:
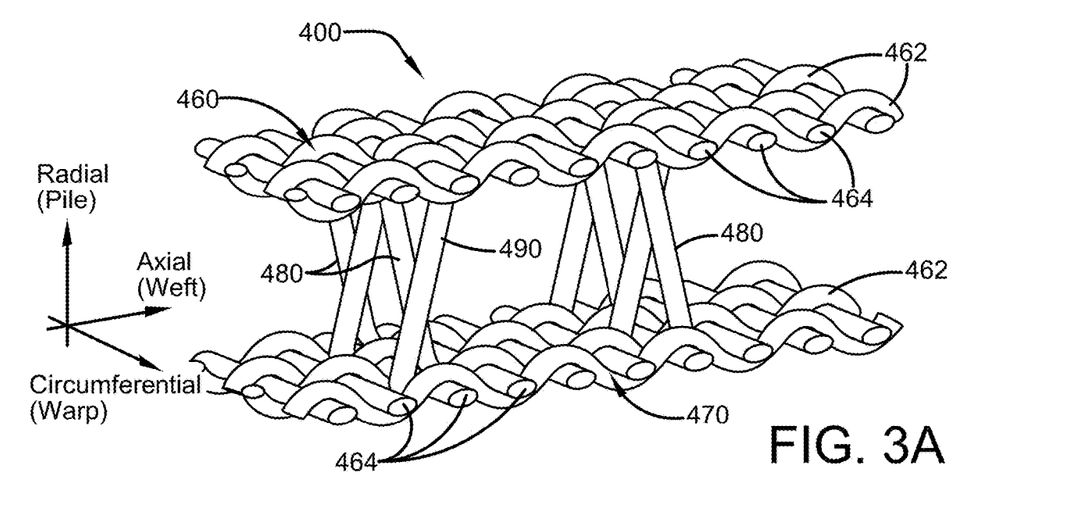
FIG. 3A is a perspective view of a first embodiment of a three-dimensional fabric structure.

A first embodiment of a shear band 300 is shown in FIG. 2A, and is comprised of a three-dimensional spacer structure 400, shown in FIG. 3A. The three-dimensional spacer structure 400 may be positioned between a first and second layer of gum rubber 332,334 (not shown to scale). The gum rubber 332,334 may be as thick as desired. The three-dimensional spacer structure 400 is a type of structure that has a first and second layer of fabric 460,470, wherein each layer of fabric is formed from a plurality of first reinforcement members 462 that extend in a first or weft direction and a plurality of second reinforcement members 464 which extend in a second or warp direction. The first and second reinforcement members 462,464 may be perpendicular to each other as shown, or crossed at a desired angle. As shown, the reinforcement members 462 are interlaced or interwoven with the reinforcements 464. The first and second reinforcement layers may be knitted, woven, nonwoven, interlaced or non-interlaced. The first and second layers 460,470 of fabric are preferably oriented parallel with respect to each other and are interconnected with each other by reinforcement connecting members 480,490 that extend in a third or pile dimension. The perpendicular distance between the connecting layers 460,470 or Z direction dimension of the three-dimensional structure is in the range of about 2 millimeters to about 25 millimeters, more preferably about 3-10 millimeters, and even more preferably in the range of 5-10 mm.

Figure 3B:
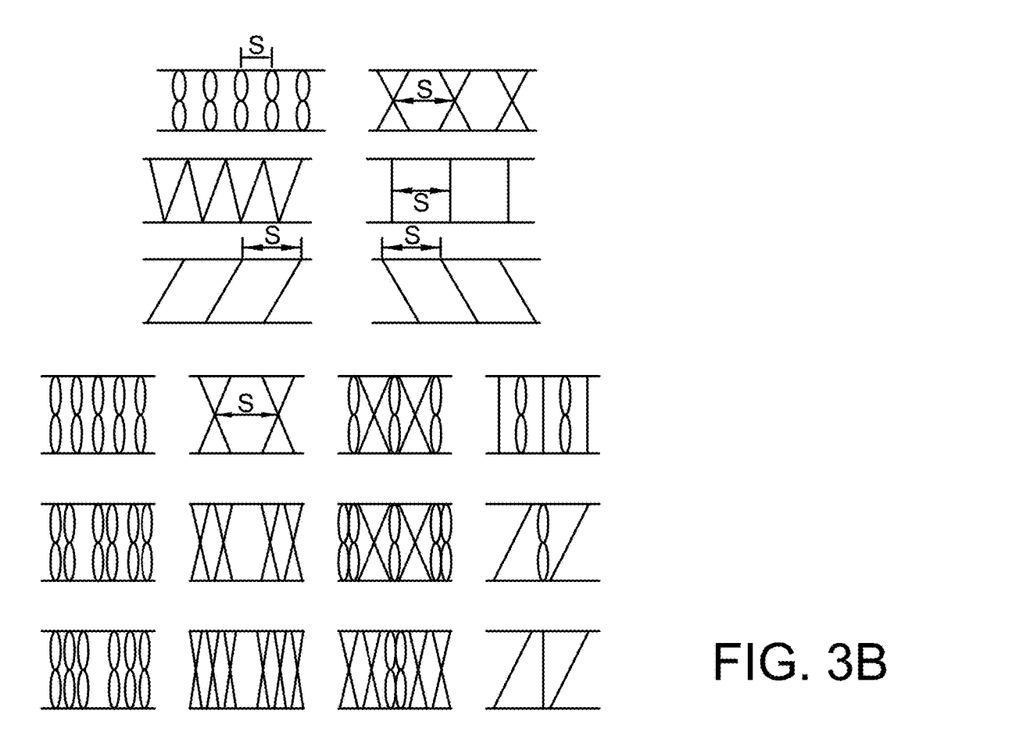
FIG. 3B illustrates various possible configurations of the cross-members.

The three-dimensional spacer structure 400 may have different arrangement of the reinforcement connecting members as shown in FIG. 3B.

The three-dimensional fabric structure 400 is preferably oriented in the shear band so that the first and second layers 460,470 are aligned in parallel relation with the axial direction. The three-dimensional fabric structure 400 has a substantial Z dimension thickness which is preferably aligned with the radial direction of the non-pneumatic tire. The open three-dimensional fabric structure 400 thus comprises a plurality of connecting members 480,490 which form open cells 495. As shown in FIG. 2A, one or more of the open cells 495 are filled with a filler material having a desired stiffness. Preferably, two or more open cells 495 are filled with the filler material, and the two or more open cells are located in the axial center of the shear band. The filler material may be an open or closed cell foam, polyurethane foam, EVA, a sealant or other soft material. These foam materials can be made of polyester-terephthalate, polyethylene-terehthalate polyurethane, phenolic foams, polystyrene foam, polyisocyanurate foam and/or using syntactic foams synthesized by filling metal, polymers, resins or ceramic matrix with hollow particles called microballoons (microspheres). The microspheres are available in wide variety of sizes and materials, including glass, cenospheres, carbon and polymers. One of the biggest advantages of these syntactic foam materials is that they can easily be designed in order to meet the required mechanical properties while being very light. The filler material is selected to have the desired compression stiffness. The filler material may also be a closed cell porous elastomer or thermoplastic elastomer. The filler material may preferably comprise a compressive modulus between about 0.1 MPa to 200 MPa, more preferably 15 MPA to 80 MPA. In one embodiment, all of the open cells 495 are filled with the filler material. In a second embodiment, not all of the open cells 495 are filled with the filler material. In another embodiment, only 3 cells are filled with the filler material.

The reinforcement member or reinforcement connecting member as used herein may comprise one or more of the following: yarn, wire, filament(s), fiber(s), or reinforcement cord(s). The reinforcement member or reinforcement cross member may be formed of glass fiber, carbon fiber, basalt fibers, organic fibers, nylon, aramid, polyester, steel or metal wire, or combinations thereof. Preferably, the reinforcement members 464 of the first and second layers 460,470 of the three-dimensional spacer may comprise inextensible reinforcements such as aramid, steel, polyester or blends thereof, that are preferably aligned with the tire circumferential direction. The inextensible reinforcements 464 may be oriented +/−15 degrees or less with respect to the tire equatorial plane, and more preferably +/−10 degrees or less with respect to the tire equatorial plane.

Preferably, the three-dimensional fabric structure 400 and/or reinforcement member is treated with an RFL adhesive, which is a well-known resorcinol-formaldehyde resin/ butadiene-styrene-vinyl pyridine terpolymer latex, or a blend thereof with a butadiene/styrene rubber latex, that is used in the tire industry for application to fabrics, fibers and textile cords for aiding in their adherence to rubber components (for example, see U.S. Pat. No. 4,356,219.) The reinforcement members may be single end dipped members (i.e., a single reinforcement member is dipped in RFL adhesive or adhesion promoter.)

The three-dimensional fabric structure 400 may have a density in the range of 700-1000 gram/meter2 as measured by DIN 12127. The compression stiffness of the three-dimensional fabric structure 400 may range from 50 to 600 kPa as measured by DIN/ISO 33861, and more preferably range from 100 to 250 kPa.

Figure 2B:
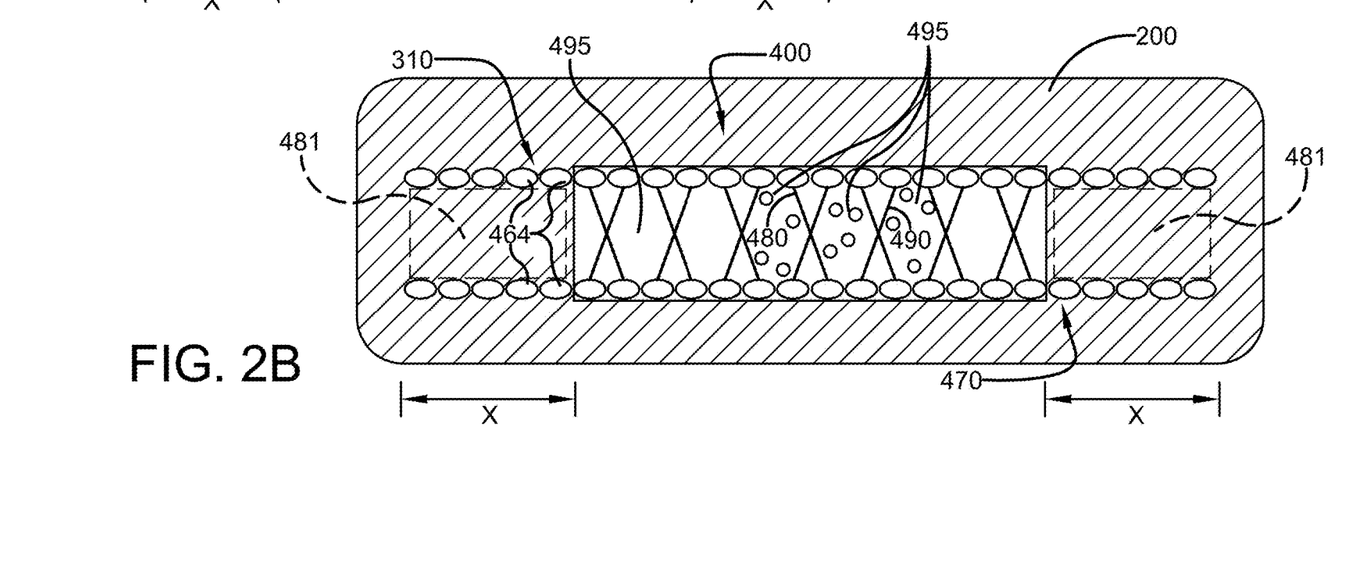
FIG. 2B is a cross-sectional view of second embodiment of a shear band and outer tread.

As shown in FIG. 2A, the three-dimensional spacer structure has an axial width L. The portion of the three-dimensional spacer structure that has cross-members has an axial width W, wherein W is less than L. The three-dimensional spacer structure has a cavity 481 at each lateral end, and having an axial width X. The width X of the cavity 481 can be adjusted as desired in order to tune the stiffness of the tire in the shoulder area. The cavity can remain empty as shown in FIG. 2A, or it can be filled up to 100% as shown in FIG. 2B. The cavity width and stiffness of the material filling the cavity can be selected as desired in order to tune the tire stiffness. X may range from 0 to 12% of the axial width L of the spacer structure. The cavity 481 may be filled with the filler material described above. In addition, the cavity 481 may have a radially inward or radially outward reinforcement layer as shown in FIGS. 2A and 2B, or the cavity may not have a radially inward or radially outward reinforcement layer (not shown). The cavity may have radially reinforcement inner layers and radially outer reinforcement layers 464 as shown in FIG. 2B, or not as shown in FIG. 2D.

Figure 2C:
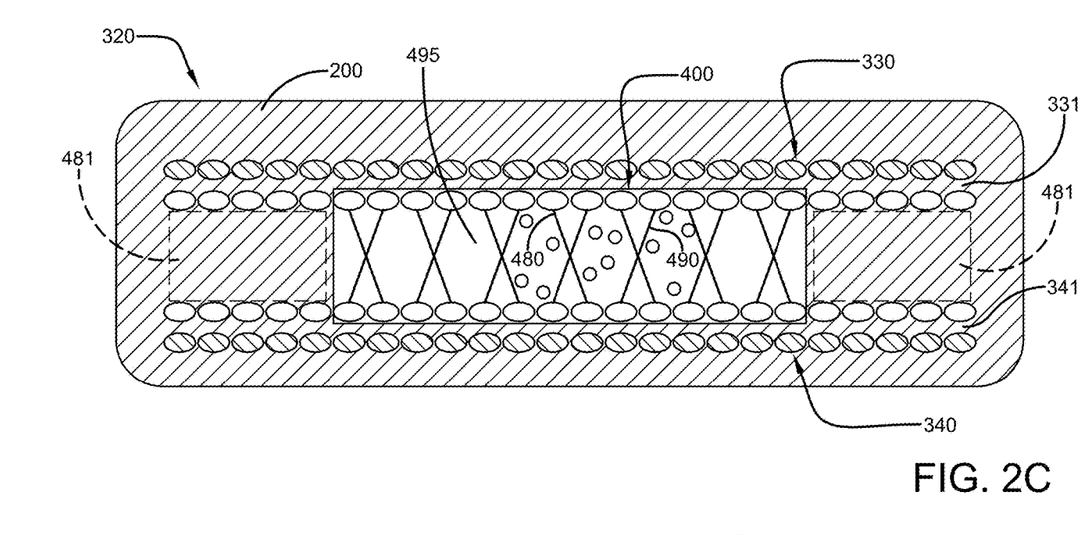
FIG. 2C is a third embodiment of a shear band.
Figure 2D:
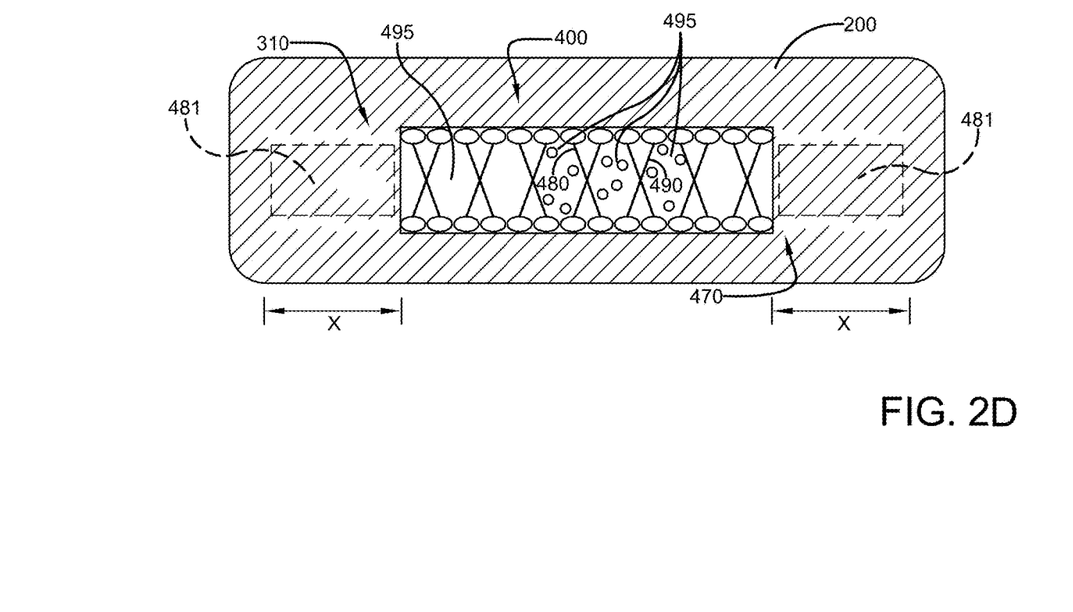
FIG. 2D is a fourth embodiment of a shear band

As shown in FIG. 2C, the shear band of FIG. 2A or 2B may additionally include a first and second membrane layer 330, 340. The first membrane layer 330 is preferably inextensible, and preferably located radially outward of the three-dimensional spacer structure 400. The shear band may further comprise a second optional membrane layer 340 that is arranged in parallel with the first membrane layer 330. If two membrane layers are utilized to form the shear band, it is preferred that the membrane layers 330,340 are separated by the three-dimensional spacer structure 400 so that the three-dimensional spacer structure 330 is located between the layers. Preferably, a layer of gum rubber 331,341 separates the three-dimensional spacer structure 330 from each reinforcement layer 330,340. The first and optional second membrane layers 330,340 each have reinforcement members or cords that are oriented at an angle in the range of 0 to about +/−10 degrees relative to the tire equatorial plane. Preferably, the angle of the reinforcement cords of the first layer is in the opposite direction of the angle of the reinforcement cords in the second layer. It is additionally preferred that the reinforcement member or cords are inextensible.

Figure 2E:
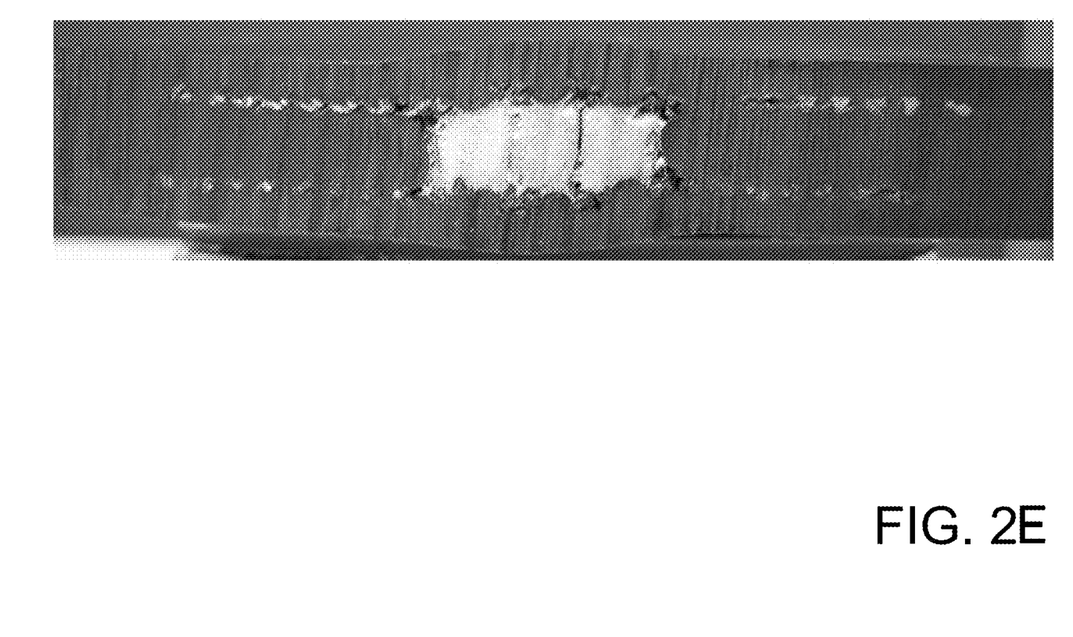
FIG. 2E is a fifth embodiment of a shear band.

FIG. 2E illustrates a shear band formed from two rubber layers, a three-dimensional spacer fabric and an inner foam layer.

The axial spacing S of the reinforcement connecting members 480 as shown in FIG. 3B may also be adjusted in order to control the stiffness of the shear band. The Spacing S may range from 3 mm to 8 mm.

Figure 4A:
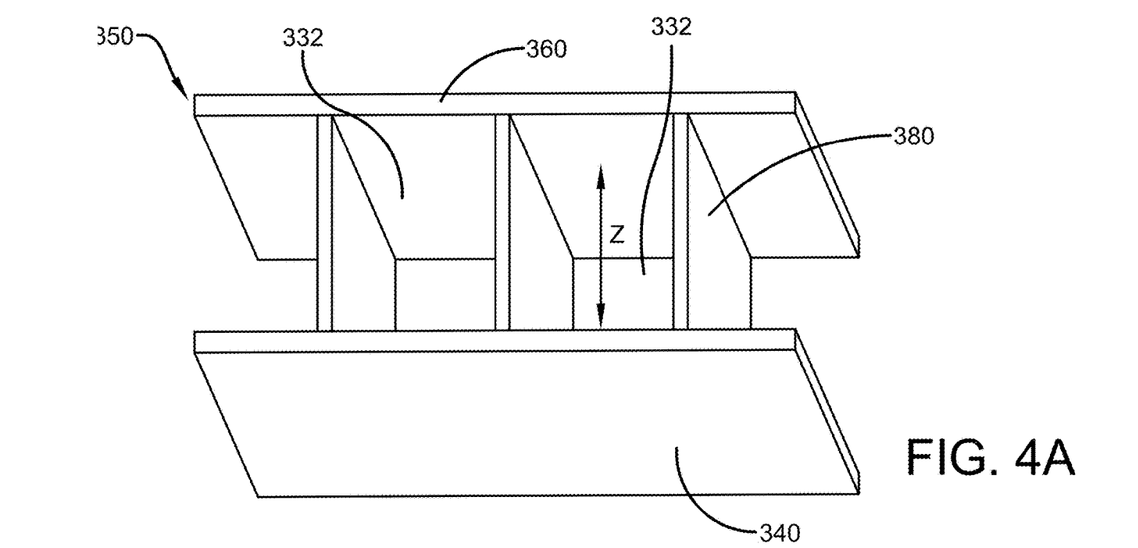
FIG. 4A is a perspective view of a second embodiment of a closed type of three-dimensional fabric structure.
Figure 4B:
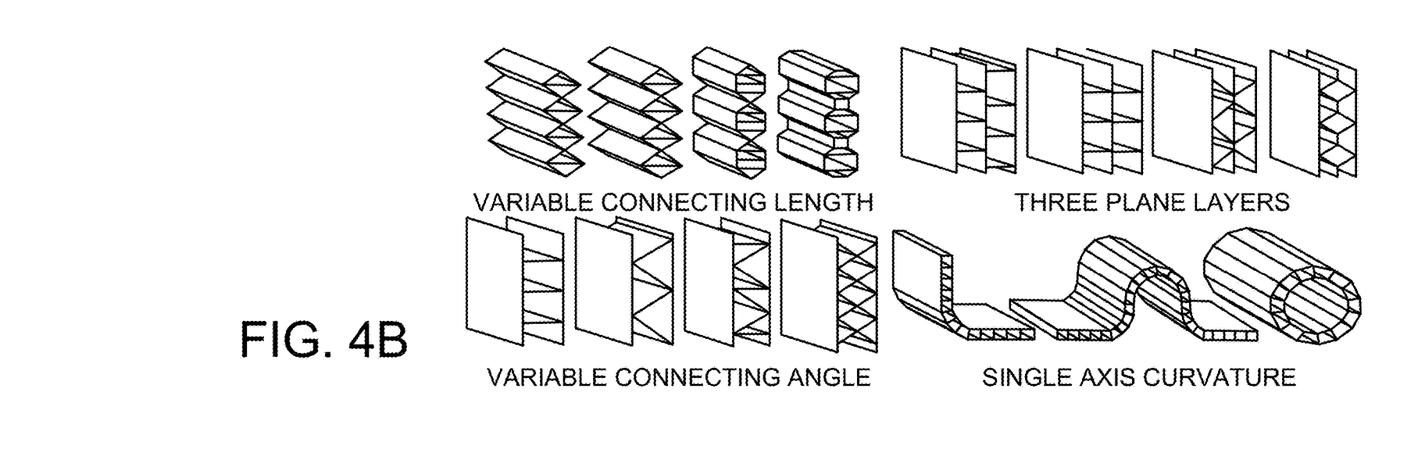
FIG. 4B illustrates various possible configurations of the fabric cross-members.

Any of the above described embodiments of the shear band may utilize the three-dimensional structure shown in FIG. 4A. The three-dimensional structure 350 shown in FIG. 4A includes a first knitted or woven layer 360 of fabric, and a second knitted or woven layer 340 of fabric. The first and second layers are joined together by a plurality of cross members 380. The cross members 380 are connected to the first and second woven layers at a 90 degree angle. The first and second woven layers 360,340 are preferably oriented in parallel relation to the axial direction. The three-dimensional spacer structure 350 is an example of a closed structure, because the cross members 380 are a close-knit fabric and not "see through". The three-dimensional spacer structure 350 may have variable connecting length, multiple layers, variable connecting angles, and single axis curvature as shown in FIG. 4B.

Figure 5:
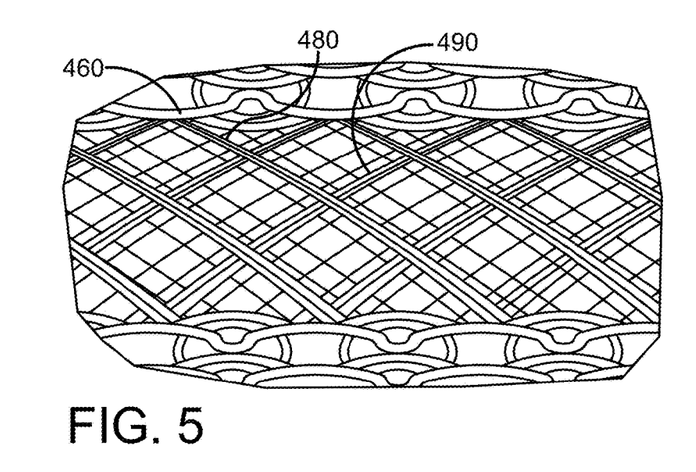
FIG. 5 is a perspective view of a third embodiment of a three-dimensional fabric structure.
Figure 6:
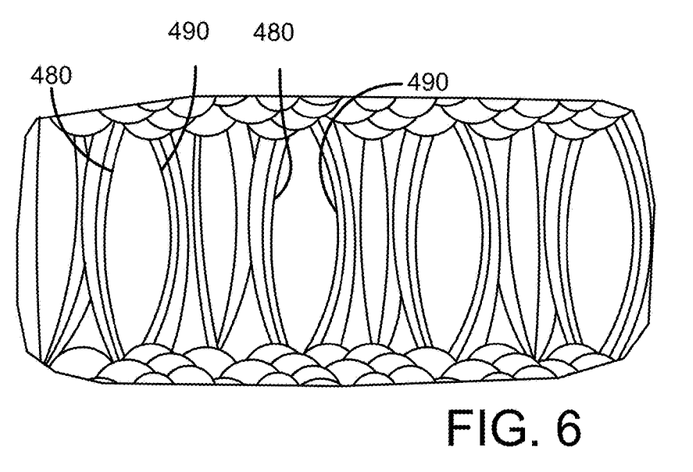
FIG. 6 is a perspective view of a fourth embodiment of a three-dimensional fabric structure.
Figure 7:
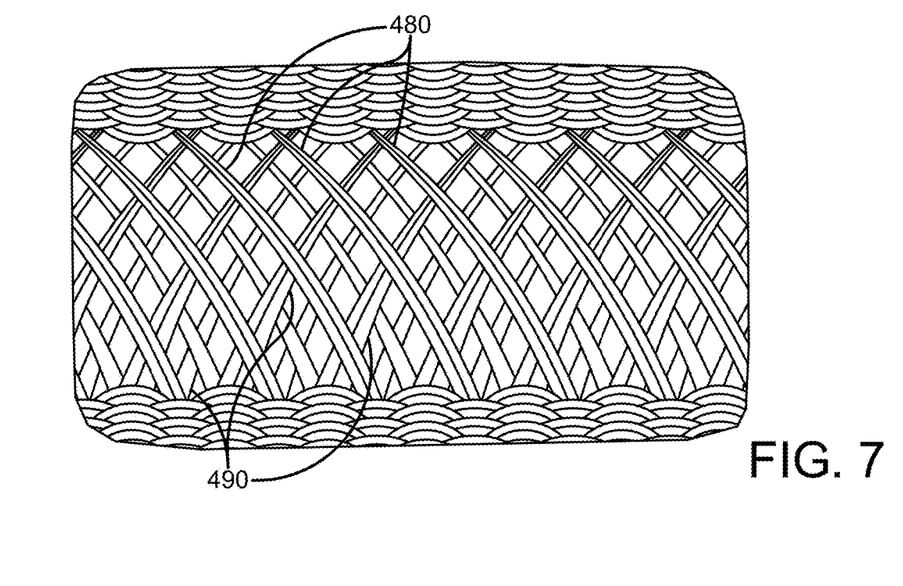
FIG. 7 is a perspective view of a fifth embodiment of a three-dimensional fabric structure.

Any of the above described embodiments of the shear band may utilize the three-dimensional structure shown in FIGS. 5-7, which illustrate various different configurations of the cross members 480, 490.

Figures 8, 9:
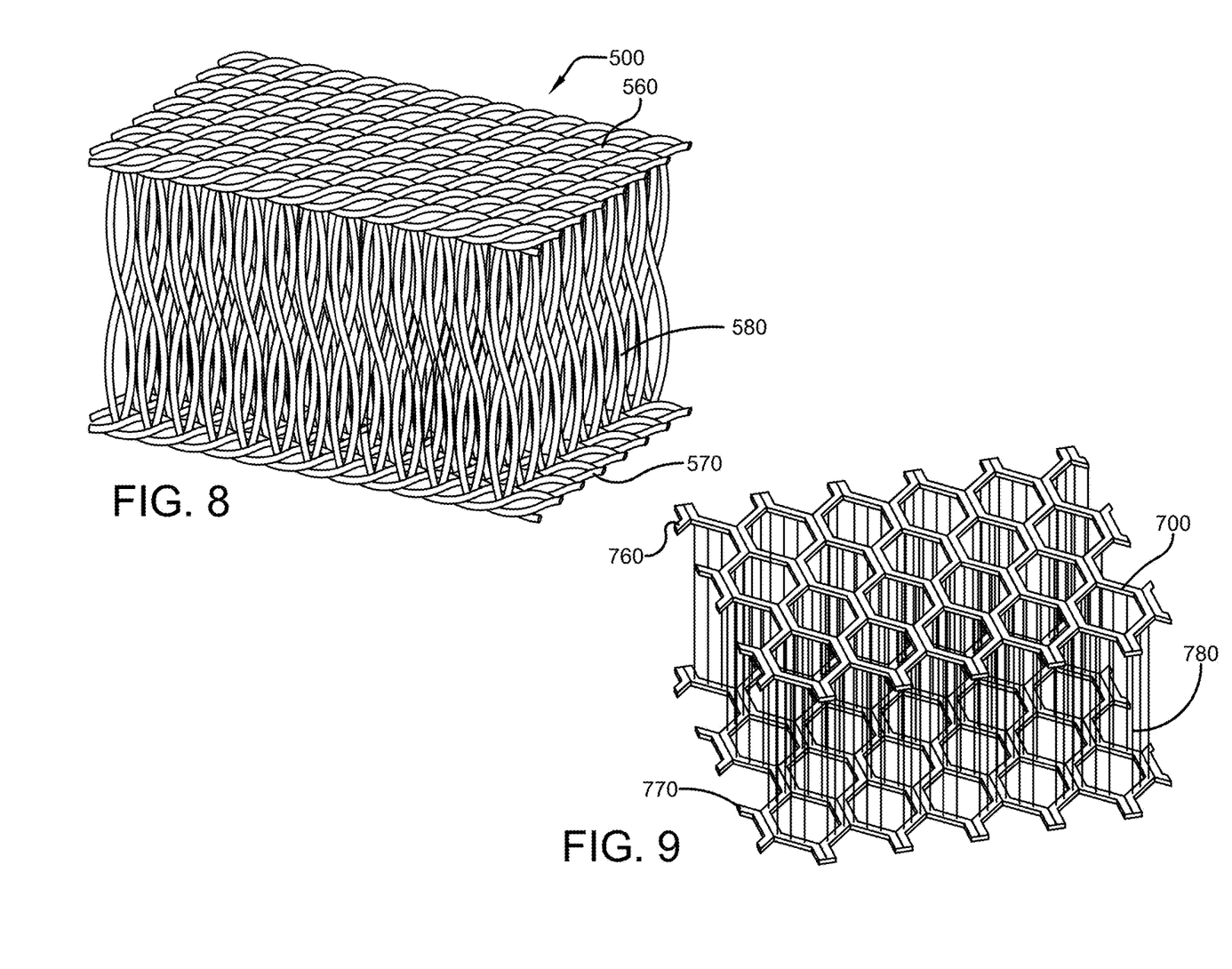
FIG. 8 is a perspective view of a sixth embodiment of a three-dimensional fabric structure.
FIG. 9 is a perspective view of a seventh embodiment of a three-dimensional fabric structure.

Any of the above described embodiments of the shear band may utilize the three-dimensional structure shown in FIG. 8. The three-dimensional structure 500 comprises a first woven layer 560 of fabric, and a second woven layer 570 of fabric. The first and second layers are joined together by a plurality of cross members 580 formed in the shape of an "8".

Figure 10:
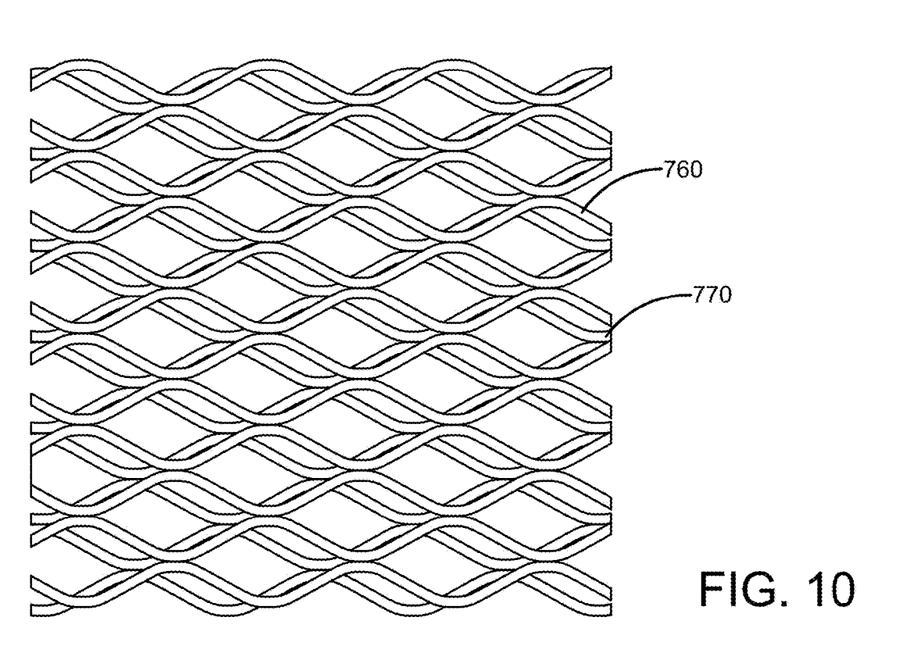
FIG. 10 is a perspective view of an eighth embodiment of a three-dimensional fabric structure.

Any of the above described embodiments of the shear band may utilize the three-dimensional structure shown in FIG. 9 or 10. The three-dimensional structure 700 of FIG. 9 comprises a first knit layer 760 of fabric, and a second knit layer 770 of fabric. The first and second layers are joined together by a plurality of knitted spacing threads 780. The first and second layers 760,770 each have openings formed by a plurality of meshes, and wherein channels are formed between the knit fabric layers and are free of spacer threads. The channels may be filled with the filler material described above.

Figure 11:
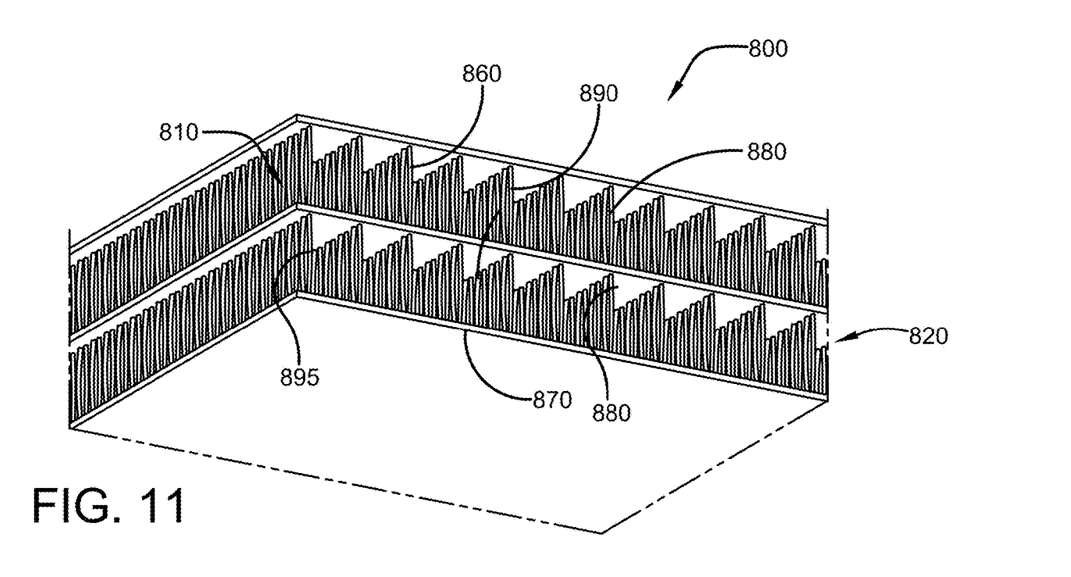
FIG. 11 is a perspective view of a ninth embodiment of a three-dimensional fabric structure.

Any of the above described embodiments of the shear band may utilize the three-dimensional structure shown in FIG. 11. The three-dimensional structure 800 comprises two or more deck layers 810,820. The three-dimensional structure 800 has a first woven layer 860 of fabric, a second woven layer 870 of fabric, and a middle woven layer 880. The first and middle layers 860,880 are joined together by a plurality of cross members 890. The second and middle layers 870,880 are also joined together by a plurality of cross members 895. The cross members 890,895 may be angled or curved as shown in FIGS. 4-8.

Any of the above described embodiments of the three-dimensional fabric structure may have a density in the range of 700-1000 gram/meter2 as measured by DIN 12127. The compression stiffness of any of the three-dimensional fabric structure may range from 50 to 600 kPa as measured by DIN/ISO 33861, and more preferably range from 100 to 250 kPa.

It is additionally preferred that the lateral ends of the shear band be tapered, so that the radial thickness of the center of the shear band is greater than the thickness at the outer ends of the shear band, as shown in FIG. 2E.

Shear Band Properties

Figure 12:
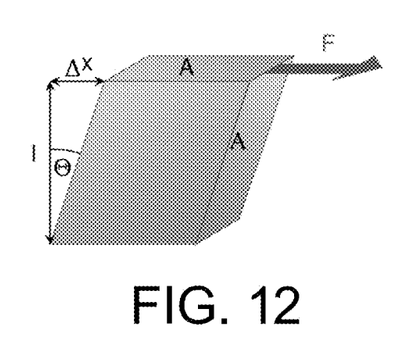
FIG. 12 is the deflection measurement on a shear band from a force F.

The shear band has an overall shear stiffness GA. The shear stiffness GA may be determined by measuring the deflection on a representative test specimen taken from the shear band. The upper surface of the test specimen is subjected to a lateral force F as shown below. The test specimen is a representative sample taken from the shear band and having the same radial thickness as the shearband. The shear stiffness GA is then calculated from the following equation:

$GA = F*L/\Delta X$, where F is the shear load, L is the shear layer thickness, and delta X is the shear deflection.

The shear band has an overall bending stiffness EI. The bending stiffness EI may be determined from beam mechanics using the three point bending test. It represents the case of a beam resting on two roller supports and subjected to a concentrated load applied in the middle of the beam. The bending stiffness EI is determined from the following equation: $EI=PL3/48*\Delta X$, where P is the load, L is the beam length, and $\Delta X$ is the deflection.

It is desirable to maximize the bending stiffness of the shearband EI and minimize the shear band stiffness GA. The acceptable ratio of GA/EI would be between 0.01 and 20, with an ideal range between 0.01 and 5. EA is the extensible stiffness of the shear band, and it is determined experimentally by applying a tensile force and measuring the change in length. The ratio of the EA to EI of the shearband is acceptable in the range of 0.02 to 100 with an ideal range of 1 to 50.

The shear band 300 preferably can withstand a maximum shear strain in the range of 15-30%.

The shear band preferably has a GA/EI in the range of 0.01 to 20, or a EA/EI ratio in the range of 0.02 to 100, or a spring rate in the range of 20 to 2000, as well as any combinations thereof. More preferably, the shear band has a GA/EI ratio of 0.01 to 5, or an EA/EI ratio of 1 to 50, or a spring rate of 170 lb./in, and any subcombinations thereof. The tire tread is preferably wrapped about the shear band and is preferably integrally molded to the shear band.

Connecting Web

The non-pneumatic tire of the present invention further includes a connecting web 500 as shown in FIG. 1. The connecting web preferably comprises a plurality of circumferentially aligned spokes 510 that extend from an inner radius to an outer radius. The spokes are preferably oriented in the radial direction. The spokes may be curved or straight. Preferably, the non-pneumatic tire comprises two sets of circumferentially aligned spokes. The spokes may have different cross-sectional designs. The spokes functions to carry the load transmitted from the shear layer. The spokes are primarily loaded in tension and shear, and carry no load in compression. Each spoke as described herein has an axial thickness A that is substantially less than the axial thickness AW of the non-pneumatic tire. The axial thickness A is in the range of 5-20% of AW, more preferably 5-10% AW. If more than one disk is utilized, than the axial thickness of each disk may vary or be the same.

The spokes 510 preferably extend in the radial direction. The spokes 510 are designed to bulge or deform in the radial direction. When the non-pneumatic tire is loaded, the spokes will deform when passing through the contact patch with substantially no compressive resistance, supplying zero or insignificant compressive force to load bearing. The predominant load of the spokes is through tension and shear, and not compression.

The spokes are preferably formed of an elastic material such as rubber or a thermoplastic elastomer. The radial spokes are designed such that the spokes have a low resistance to radial deformation and a higher resistance to the lateral deformation of the tire.

If the material selected is a thermoplastic elastomer, then it is preferred to have the following properties. The tensile (Young's) modulus of the disk material is preferably in the range of 45 MPa to 650 MPa, and more preferably in the range of 85 MPa to 300 MPa, using the ISO 527-1/-2 standard test method. The glass transition temperature is less than −25 degree Celsius, and more preferably less than −35 degree Celsius. The yield strain at break is more than 30%, and more preferably more than 40%. The elongation at break is more than or equal to the yield strain, and more preferably, more than 200%. The heat deflection temperature is more than 40 degree C. under 0.45 MPa, and more preferably more than 50 degree C. under 0.45 MPa. No break result for the Izod and Charpy notched test at 23 degree C. using the ISO 179/ISO180 test method. Two suitable materials for the disk is commercially available by DSM Products and sold under the trade name ARNITEL PL 420H and ARNITEL PL461.

Applicants understand that many other variations are apparent to one of ordinary skill in the art from a reading of the above specification. These variations and other variations are within the spirit and scope of the present invention as defined by the following appended claims.

What is claimed:

1. A tire comprising a shear band formed from a three-dimensional spacer structure, wherein the three-dimensional spacer structure is formed from a first and second layer of material,
   each layer of material having first reinforcement members which extend in a first direction, and second reinforcement members which extend in a second direction, wherein the first and second reinforcement members are woven together to form a fabric;
   wherein said first layer of material is connected to the second layer of material by a plurality of connecting reinforcement members which extend in a third direction, wherein the first and second layers are separated by a distance Z in the range of 2 to 15 millimeters;
   wherein the three-dimensional spacer structure further includes a plurality of cells formed between the connecting members, and wherein one or more of the cells are filled with a foam or a filler material.

2. The tire of claim 1 wherein at least two cells are filled cells.

3. The tire of claim 1 wherein the filler material is EVA.

4. The tire of claim 1 wherein the filler material is a sealant or other soft material.

5. The tire of claim 1 wherein the filler material has a compressive modulus between about 0.1 MPa to 200 MPa.

6. The tire of claim 1 further including an inextensible membrane layer.

7. The tire of claim 1 wherein the three-dimensional spacer structure is auxetic.

8. The tire of claim 1 wherein the connecting members are perpendicular to the first and second layer of material.

9. The tire of claim 1 wherein an axial width W of the connecting members is less than the axial width of the three-dimensional spacer structure.

10. The tire of claim 1, wherein only one cell is filled.

11. The tire of claim 10, wherein the shear band has tapered lateral ends.

12. A tire comprising a shear band formed from a three-dimensional annular spacer structure, wherein the three-dimensional annular spacer structure is formed from a first and second layer of material, wherein the three dimensional annular spacer structure has a first lateral end, a second lateral end, and a first axial width extending between the first and second lateral ends, wherein the first axial width is perpendicular to an axial direction of the tire,
   each layer of material having first reinforcement members which extend in a first and direction, and second reinforcement members which extend in a second direction,
   wherein said first layer of material is connected to the second layer of material by a plurality of connecting reinforcement members which extend in a third direction, wherein the three-dimensional annular spacer structure further includes a plurality of cells formed between the connecting members, and wherein one or more of the cells are filled with a foam, wherein the filled cells are located solely in a region that spans a second axial width, wherein the second axial width is parallel to the first axial width and extending between respective first and second ends of the second axial width, and wherein the first axial width extends past both the first and second ends of the second axial width.

* * * * *